United States Patent

Riley

[11] 3,879,888
[45] Apr. 29, 1975

[54] SOIL CONDITIONER DEPOSITING APPARATUS

[76] Inventor: Eugene D. Riley, 3807 Tully Rd., Hughson, Calif. 95326

[22] Filed: Dec. 21, 1973

[21] Appl. No.: 427,111

[52] U.S. Cl. .......................... 47/1; 220/370; 47/1.7
[51] Int. Cl. ............................................. A01c 15/12
[58] Field of Search ............... 172/5; 222/174, 370; 27/1.7, 1.43, 1

[56] References Cited
UNITED STATES PATENTS

| | | | |
|---|---|---|---|
| 1,751,346 | 3/1930 | Mazak | 47/1.7 |
| 2,682,132 | 6/1954 | Marihart | 47/1 |
| 3,016,653 | 1/1962 | Gardner | 47/1.7 |
| 3,162,153 | 12/1964 | Schulz | 222/370 X |
| 3,177,950 | 4/1965 | Laikam | 172/5 |
| 3,193,155 | 7/1965 | Hazen | 222/370 X |
| 3,210,084 | 10/1965 | Vanderlely et al. | 47/1.7 |
| 3,221,949 | 12/1965 | Dingus | 222/370 X |

FOREIGN PATENTS OR APPLICATIONS
49,831 8/1939 France .................... 47/1.7

Primary Examiner—Robert E. Bagwill
Attorney, Agent, or Firm—Roger B. Webster

[57] ABSTRACT

An agricultural apparatus operative, upon advance along a vineyard row, to automatically deposit a quantity of dry, free-flowing soil conditioner (such as granular chemical fertilizer) adjacent the trunk of each grapevine in the row, and to then discontinue such depositing until the next grapevine is reached; this to prevent an uneconomical expenditure of the soil conditioner in zones where not needed. The apparatus, which is supported for tractor movement, includes a hopper for the soil conditioner, a hopper-mounted feeder adapted upon each actuation thereof to discharge a measured quantity of the soil conditioned, and a mechanism to actuate the feeder upon the machine passing each vine trunk.

5 Claims, 7 Drawing Figures

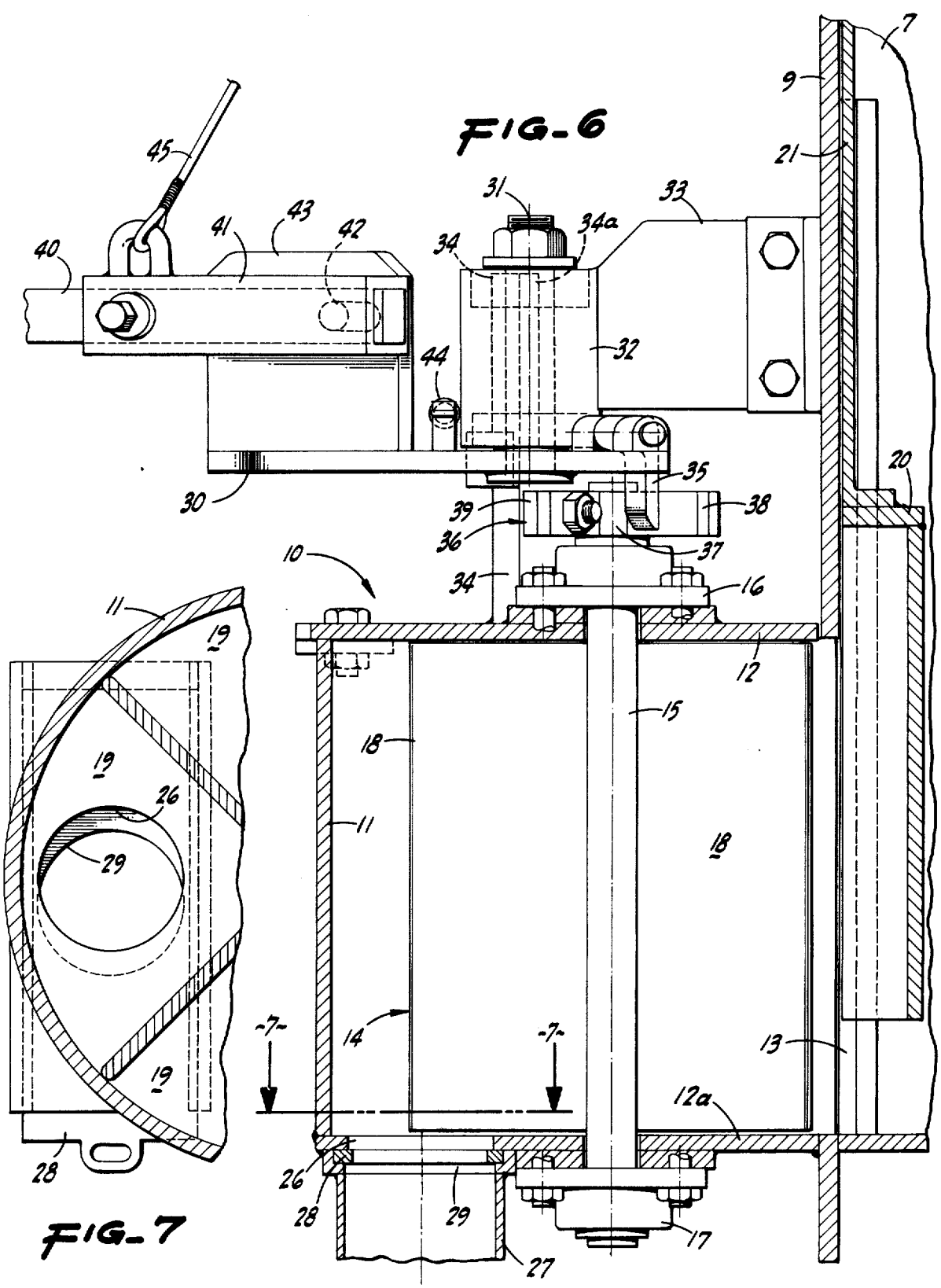

SOIL CONDITIONER DEPOSITING APPARATUS

BACKGROUND OF THE INVENTION

With many known soil conditioner depositing machines, the discharge of the dry, free-flowing material is continuous, or must be manually controlled if intermittent discharge is desired. The present invention was conceived in a successful effort to provide intermittent discharge of the soil conditioner, and at desired points, without the necessity of control by an operator of the machine.

SUMMARY OF THE INVENTION

The present invention provides, as a major object, an agricultural apparatus operative, upon advance along a vineyard row, to automatically deposit a quantity of dry, free-flowing soil conditioner (such as granular chemical fertilizer) adjacent the trunk of each grapevine in the row, and to then discontinue such depositing until the next grapevine is reached; such recurrent depositing of the soil conditioner being in response to movement of a laterally projecting swing arm which engages and is swung rearwardly by each vine trunk (or its supporting stake) as the machine passes thereby.

The present invention provides, as another important object, an agricultural apparatus, as in the preceding paragraph, which includes a hopper for the soil conditioner, a hopper-mounted feeder adapted upon each actuation thereof to discharge a measured quantity of the soil conditioner, and a mechanism to actuate the feeder upon the machine passing each vine trunk; such mechanism embodying the aforesaid swing arm.

The present invention provides, as a further object, a soil conditioner depositing apparatus which is designed for ease and economy of manufacture.

The present invention provides, as a still further object, a practical, reliable, and durable soil conditioner depositing apparatus, and one which is exceedingly effective for the purpose for which it is designed.

BRIEF DESCRIPTION OF THE DRAWINGS

FIG. 6 is a sectional elevation of the feeder; the view being taken substantially on line 6—6 of FIG. 3.

FIG. 7 is a fragmentary sectional plan taken substantially on line 7—7 of FIG. 6.

DESCRIPTION OF THE PREFERRED EMBODIMENT

Figure 1:
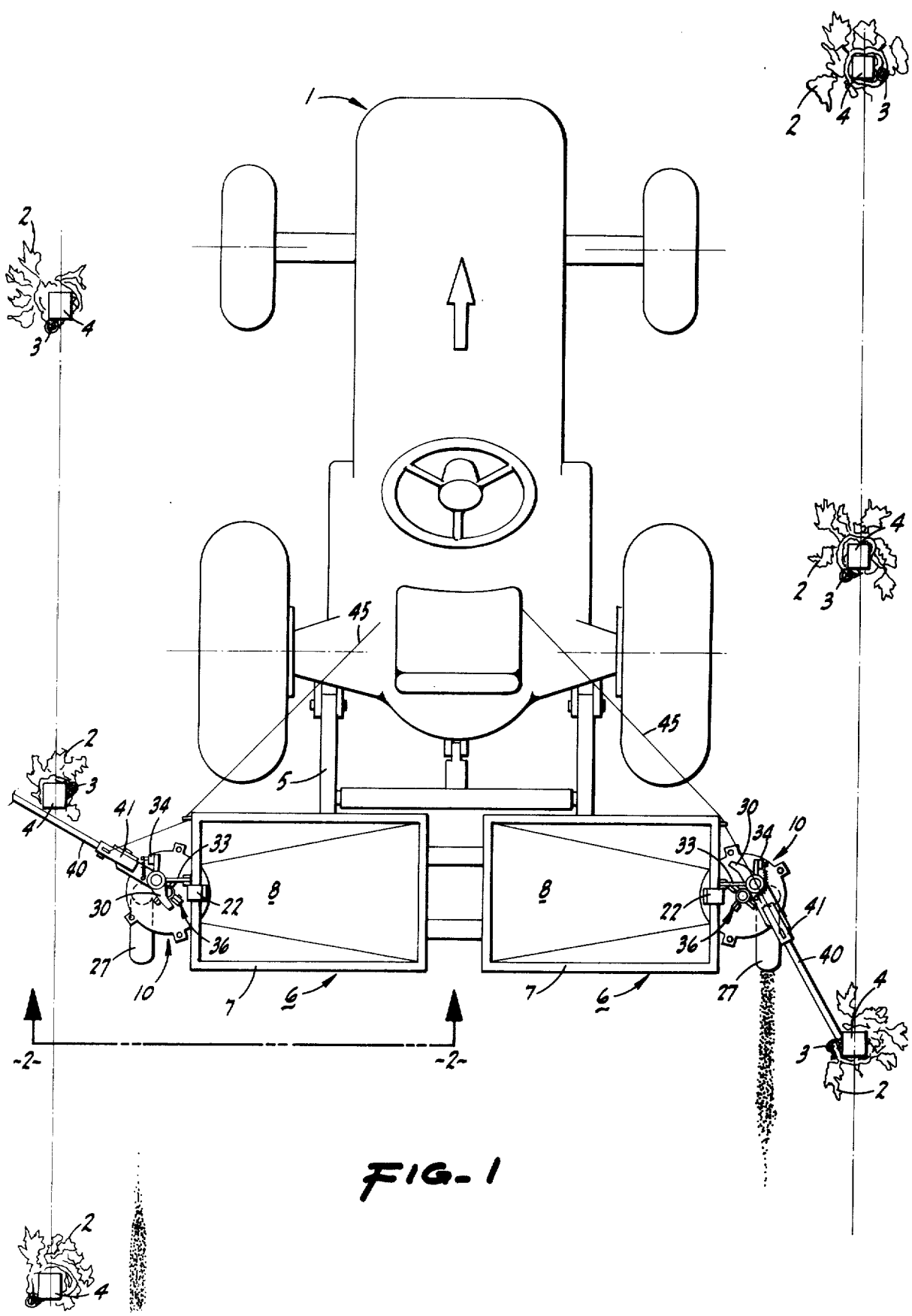
FIG. 1 is a plan view of a tractor fitted with both a right-hand and a left-hand soil conditioner depositing apparatus; this in order to effect soil conditioner deposit adjacent the grapevines of two rows between which the tractor travels.
Figure 2:
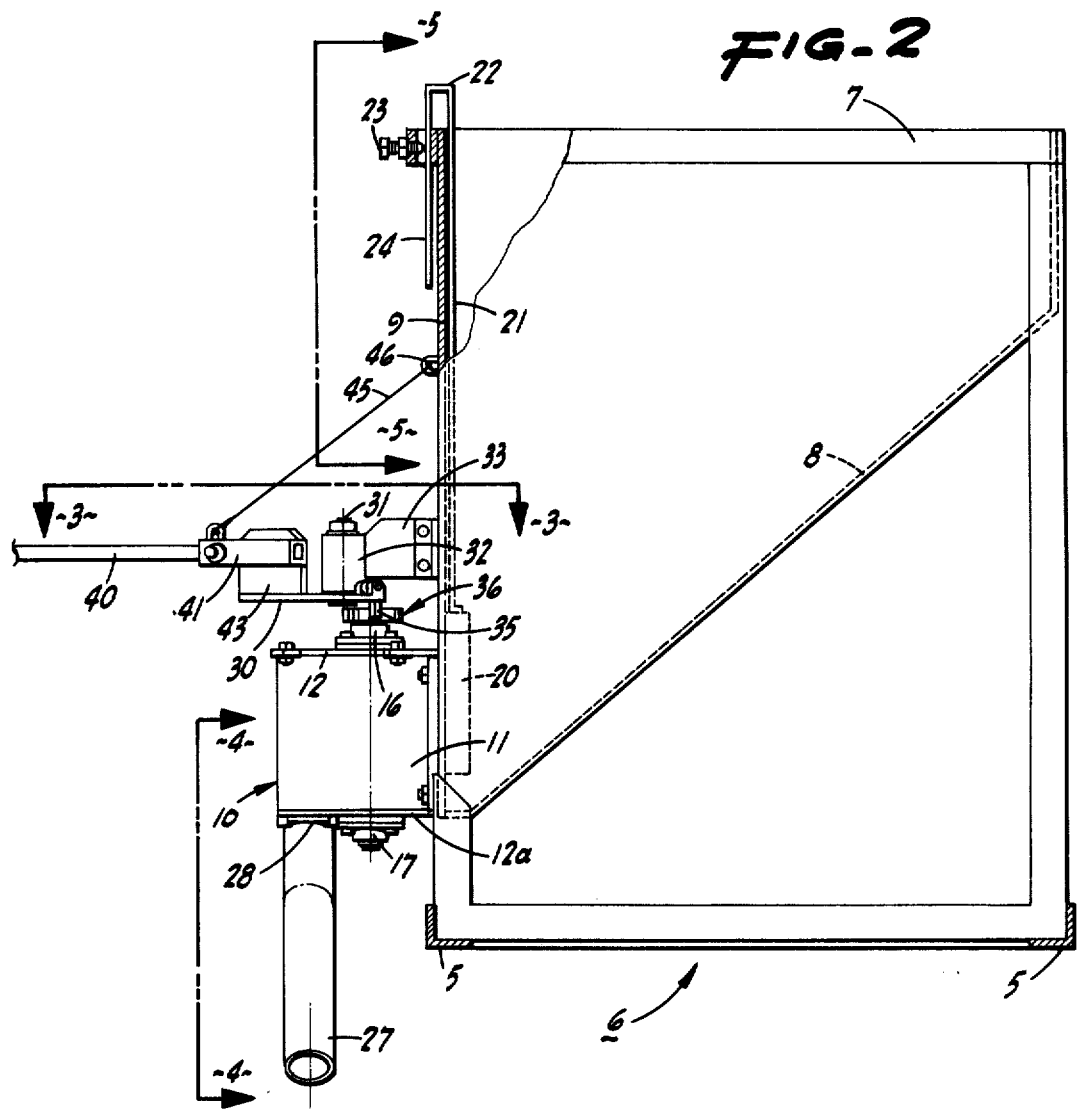
FIG. 2 is a rear elevation of the left-hand soil conditioner depositing apparatus; the view being taken substantially on line 2—2 of FIG. 1.
Figure 4:
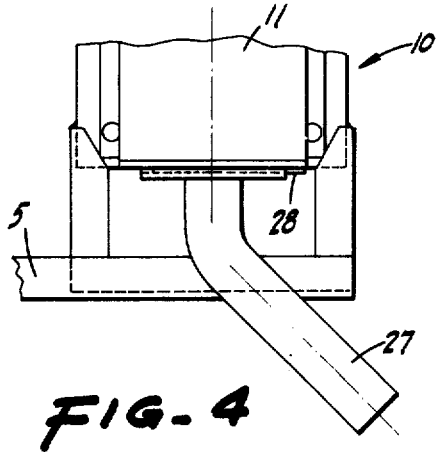
FIG. 4 is a fragmentary side elevation taken substantially on line 4—4 of FIG. 2.
Figure 5:
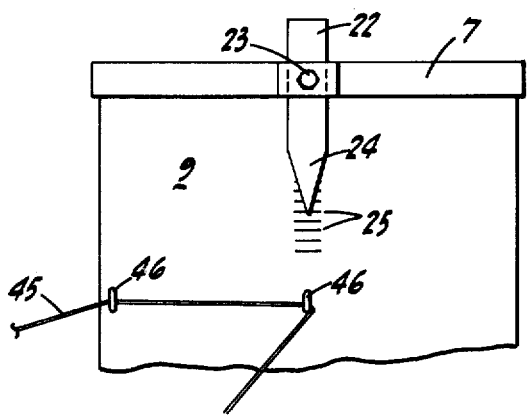
FIG. 5 is a fragmentary side elevation taken substantially on line 5—5 of FIG. 2.

Referring now more particularly to the drawings and to the characters of reference marked thereon, the apparatus of the present invention is adapted to be mounted on a tractor 1 for movement lengthwise of, and between, adjacent rows of grapevines 2; each of the grapevines having a trunk 3 and a supporting stake 4. In the present embodiment (as shown in FIG. 1), the tractor is fitted at the rear, and on its implement-supporting frame 5, with both a right-hand and a left-hand soil conditioner depositing apparatus; each such apparatus being indicated generally at 6. As the apparatuses 6 are identical—except for being right-hand and left-hand—a detailed showing and description of one (the left-hand apparatus) will suffice for the purposes of this specification.

Each apparatus 6 is constructed, and functions, as follows:

A stationary, hopper-type bin 7 is mounted on the frame 5 and includes a laterally, outwardly sloping bottom 8 and an outer sidewall 9.

A vertical axis, rotary feeder—indicated generally at 10—is mounted on the outer sidewall 9 of bin 7 in a position upstanding from the horizontal plane of the lower edge of the sloping bottom 8.

The rotary feeder 10 includes a cylindrical casing 11 having a top plate 12 and a bottom plate 12a; such cylindrical casing 11 being chordally open at, and communicating with, a matching opening 13 in the outer sidewall 9 whereby dry, freeflowing soil conditioner (such as granular chemical fertilizer) carried in the bin 7 can gravitationally deliver into the cylindrical casing 11. A vertical axis rotor 14 is disposed in the cylindrical casing 11 and includes a center shaft 15 journaled, as at 16, on the top plate 12, and at 17 on the bottom plate 12a.

Four vanes 18 are fixed on and radiate from the center shaft 15, with such vanes being equidistantly circumferentially spaced from each other; i.e., 90° apart. The vanes 18, which have an easy running fit in the cylindrical casing 11, extend substantially the full distance between the top plate 12 and bottom plate 12a while radially extending substantially to the cylindrical casing 11. As so constructed, the rotor 14 defines four, circumferentially disposed pockets 19 of like form and equal size adapted—upon intermittent turning of the rotor 14—to successively register with opening 13 and then receive soil conditioner gravitationally displaced from the bin 7 through said opening 13.

In each static position of the rotor 14, and at which time a corresponding pocket 19 is in register with the opening 13 in wall 9, the amount of soil conditioner which can gravitationally displace from bin 7 into said registering pocket is controlled by means of a vertically adjustable, shutter-type gate 20 which overlies such opening within the confines of the bin 7; such gate 20 being of horizontally curved configuration to prevent striking thereof by the outer ends of the vanes 18 as such ends sweep in part through the opening 13.

The gate 20—which is suitably guided at its opposite vertical edges on wall 9 as shown—is attached at the top to an upstanding suspension strip 21 which leads upwardly in bin 7 adjacent the wall 9; such strip 21, at its upper end, being formed with a downwardly opening U-shaped bail 22 which encompasses the upper edge of said wall 9, and which bail is vertically adjustable secured in a selected position by a set screw 23 which bears against the outer leg of the bail.

The lower end of the outer leg of the bail 22 is formed as a pointer 24 which reads on a scale 25 inscribed on the exterior of the wall 9; such pointer and scale providing an exteriorly visible indicator of the position of the gate 20 relative to the opening 13.

Each time the rotor 14 is quarter-turned by the mechanism hereinafter described, and one of the pockets 19 registeres with the opening 13 for loading of such pocket with soil conditioner, an opposed pocket 19 registers at its lower end with an outlet opening 26 in the bottom plate 12a whereby the quantity of soil conditioner—previously introduced into such opposed pocket—delivers downwardly therefrom into a discharge tube 27 mounted in connection with and depending from said bottom plate. From the discharge tube the dry, free-flowing soil conditioner delivers directly onto the ground. Also, if desired, the tube 27 may feed into a shoe or the like not here shown, but by means of which the soil conditioner may be introduced into the ground below the surface thereof.

At the juncture of the upper end of the discharge tube 27 with the bottom plate 12a, there is a suitably mounted slide gate 28 having a circular port 29 which normally substantially registers with the outlet opening 26. However, if working conditions require less rapid discharge of the soil conditioner through outlet opening 26 and into the discharge tube 27, the slide gate 28 is horizontally adjusted to a position which reduces the registry between said outlet opening 26 and port 29.

As the apparatus 6 passes each grapevine of the row, the rotor 14 is turned clockwise ninety degrees whereby to position an empty pocket 19 in register with the opening 13 for filing, and the opposed—previously filled—pocket 19 in register with the outlet opening 26 whereby a quantity of soil conditioner then delivers from said opposed pocket into the discharge tube 27, resulting in a quantity of soil conditioner being ground-deposited adjacent the trunk of such vine. Such recurrent actuation (i.e., quarter-turn) of the rotor 14 is accomplished by means of the following mechanism:

A horizontally swingable, dogleg lever 30 is journaled intermediate its ends, at a point above the casing 11 and offset from the shaft 15, on a vertical spindle 31 by means of a journal sleeve 32; the latter being held in a fixed position by a rigid horizontal bracket 33 which projects laterally outward from the wall 9 of the bin. Additionally, there is another rigid bracket 34 connected to a post 34a upstanding from the top plate 12 of the casing 11.

At its inner end, the horizontally swingable dogleg lever 30 is fitted with a pivotally attached, depending pawl 35 arranged—in relation to clockwise turning motion of said lever 30—so that said pawl cannot swing rearwardly of vertical, but can swing forwardly of vertical. The pawl 35 depends into the horizontal plane of a spider wheel, indicated generally at 36, fixed on the upper end of the rotor shaft 15 above the journal 16 and adapted for clockwise turning motion; such spider wheel 36 including a hub 37, and four spider arms 38 radiating therefrom in equally spaced relation. At its outer end, and on the trailing face thereof, each spider arm 38 is fitted with a replaceable contact pad 39. The outer ends of the spider arms 38, and consequently the replaceable contact pads 39, lie in the arcuate path traversed by pawl 35 upon turning of lever 30.

Figure 3:
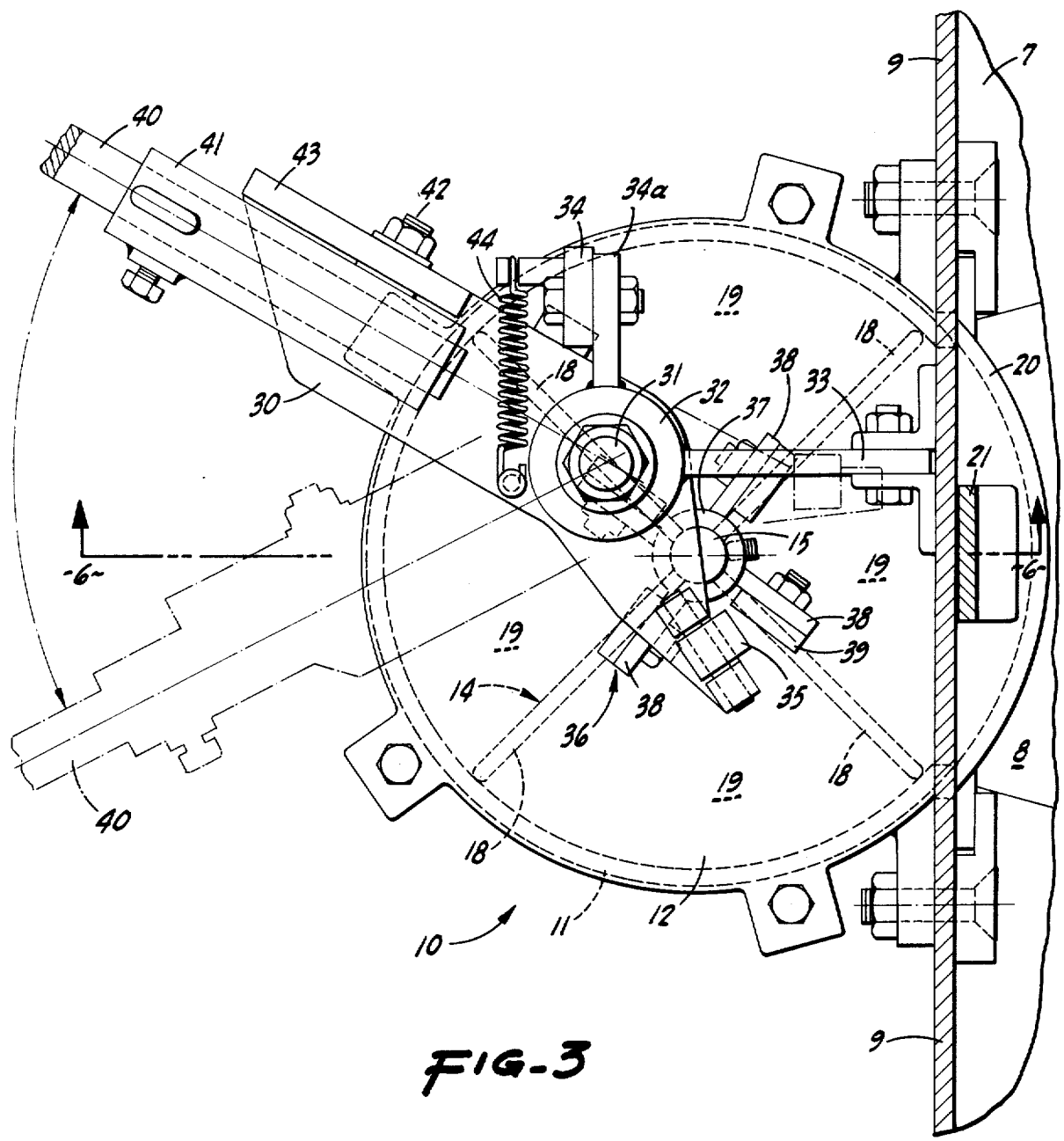
FIG. 3 is an enlarged sectional plan of the feeder; the view being taken substantially on line 3—3 of FIG. 2.

The outer section of said lever 30 normally occupies a forwardly diagonal position as shown in full lines in FIG. 3. However, upon swinging of such outer section of the lever 30 to a rearwardly diagonal position and attendant forward swinging of the inner section of such lever, a shown in broken lines in FIG. 3, the pawl 35 engages an immediately-ahead contact pad 39 from the rear, and rotates the spider wheel 36 a quarter turn and which effects a like turning motion of the rotor 14. This, of course, moves one pocket 19 into register with the opening 13 for filling, and the opposite pocket into register with the outlet opening 26 for discharge of the soil conditioner from the latter, as previously described.

Rearward swinging of the outer section of lever 30, and attendant forward swinging of the inner section thereof, is caused—upon the apparatus 6 passing each grapevine 2—by a laterally projecting swing arm 40 adjustable secured in a sleeve 41 attached by a transverse pivot bolt 42 to a flange 43 upstanding from the outer section of said lever 30. The dimensions and relationships of the parts, including the offset of the vertical spindle 31 from the rotor shaft 15, are such that—as the apparatus travels forwardly and the laterally projecting swing arm 40 engages either the trunk 3 (or the supporting stake 4) of each grapevine 2—the arm 40 is, by reason of the aforesaid engagement, swung rearwardly a sufficient distance to cause the desired quarter turn of the spider wheel 36 and rotor 14.

As soon as the swing arm 40 escapes each vine trunk 3 (or the supporting stake 4), the outer portion of the lever 30 is returned to its initial, forwardly diagonal position by a return spring 44; the lever 30 then coming to rest against the posts 34a as a stop. At the same time, the inner section of the lever 30 swings rearwardly to its initial position whereby the pawl 35 engages and slips over the next following spider arm 38 and gravitationally drops behind the contact pad 39 thereof. Then, until the apparatus is caused to function by the next grapevine of the row, such apparatus remains inactive and no soil conditioner is deposited until such next grapevine is reached.

It will be recognized that the mechanism between the laterally projecting swing arm 40 and the rotor shaft 15 is essentially a rotary pawl and ratchet unit providing translation of swinging motion to rotary motion sufficient to cause a quarter turn of the rotor 14.

A pull cord 45 is attached to the sleeve 41 outwardly of the pivot bolt 42, and thence such pull cord extends upwardly toward the bin, passes through guide eyes 46 thereon, and then runs forwardly to the tractor. By pulling on the cord 45, the tractor operator causes the sleeve 41—as well as the swing arm 40—to raise to a substantially upright, non-working position; this being done to prevent operation of the apparatus 6 any time working conditions so require.

While the apparatus of the present invention is here shown and described as used in a vineyard, it is to be recognized that such apparatus can equally well be employed—with like function and purpose—in an orchard, and in such event the swing arm 40 will successively engage and be swung by the trunks of the orchard trees.

From the foregoing description, it will be readily seen that there has been produced such a soil conditioner depositing apparatus as substantially fulfills the objects of the invention, as set forth herein.

While this specification sets forth in detail the present and preferred constructions of the soil conditioner depositing apparatus, still in practice such deviations from such detail may be resorted to as do not form a departure from the spirit of the invention, as defined by the appended claims.

I claim:

1. An agricultural apparatus operative, upon advance along a vineyard row, to ground-deposit a quantity of dry, free-flowing soil conditioner adjacent each grapevine in the row, and to then discontinue such depositing until the next grapevine is reached; the apparatus comprising a bin for the soil conditioner, a discharge member, a normally inactive mechanism between the bin and discharge member operative, when actuated, to deliver a quantity of the soil conditioner, from the bin, to such discharge member, and means to automatically actuate said mechanism upon the apparatus passing each grapevine; said mechanism including a rotary feeder mounted in communication with the bin and having a rotor turnable to successive positions in each of which the feeder receives a quantity of soil conditioner from the bin and delivers a quantity of soil conditioner to the discharge member, and a rotary ratchet and pawl unit associated with the rotary feeder in actuating relation to the rotor; said means being arranged to actuate said ratchet and pawl unit to turn the rotor to one of such positions upon the apparatus passing each grapevine.

2. An agricultural apparatus operative, upon advance along a vineyard row, to ground-deposit a quantity of dry, free-flowing soil conditioner adjacent each grapevine in the row, and to then discontinue such depositing until the next grapevine is reached; the apparatus comprising a bin for the soil conditioner, a discharge member, a normally inactive mechanism between the bin and discharge member operative, when actuated, to deliver a quantity of the soil conditioner, from the bin, to such discharge member, and means to automatically actuate said mechanism upon the apparatus passing each grapevine; said mechanism including a rotary feeder mounted in communication with the bin and having a pocketed rotor turnable to successive positions in each of which the feeder receives in one pocket a quantity of soil conditioner from the bin and delivers from another pocket a quantity of soil conditioner to the discharge member, and a rotary ratchet and pawl until arranged with and, when actuated, operative to turn the rotor to such successive positions; and said means including, and the ratchet and pawl unit being actuated in response to movement of, a swing arm projecting in connected relation laterally from said ratchet and pawl unit for engagement with, and rearward swinging by, the trunk or supporting stake of each grapevine upon advance of the apparatus.

3. An agricultural apparatus operative, upon advance along a vineyard row, to ground-deposit a quantity of dry, free-flowing soil conditioner adjacent each grapevine in the row, and to then discontinue such depositing until the next grapevine is reached; the apparatus comprising a bin for the soil conditioner, a rotary feeder mounted in connection with the bin and including a vertical cylindrical casing having a bottom plate, and a pocketed rotor journaled in the casing; the casing having a filling opening in communication with the bin, the bottom plate having an outlet opening therein circumferentially spaced from said filling opening, and the pockets in the rotor being formed and disposed so that when the rotor is in a position with one pocket registering with the filling opening to receive soil conditioner from the bin, another pocket registers with the outlet opening to deliver soil conditioner therethrough, a soil conditioner discharge tube leading from the outlet opening, a normally inactive rotary ratchet and pawl unit associated with the rotary feeder and operative, when actuated, to turn the rotor to successive ones of said positions, and means to actuate said ratchet and pawl unit upon the apparatus passing each grapevine.

4. An agricultural apparatus operative, upon advance along a vineyard row, to ground-deposit a quantity of dry, free-flowing soil conditioner adjacent each grapevine in the row, and to then discontinue such depositing until the next grapevine is reached; the apparatus comprising a bin for the soil conditioner, a rotary feeder mounted in connection with the bin and including a vertical cylindrical casing having a bottom plate, and a pocketed rotor journaled in the casing; the casing having a filling opening in communication with the bin, the bottom plate having an outlet opening therein circumferentially spaced from said filling opening, and the pockets in the rotor being formed and disposed so that when the rotor is in a position with one pocket registering with the filling opening to receive soil conditioner from the bin, another pocket registers with the outlet opening to deliver soil conditioner therethrough, a soil conditioner discharge tube leading from the outlet opening, a normally inactive mechanism associated with the rotary feeder and operative, when actuated, to turn the rotor to successive ones of said positions, and means to actuate said mechanism upon the apparatus passing each grapevine; the casing having a top plate and the rotor including an axial shaft projecting above said top plate; said mechanism comprising a ratchet and pawl unit embodying a spider wheel fixed on the shaft above the top plate, the spider wheel having a plurality of circumferentially spaced radial spider arms, a rotary lever journaled for arcuate motion in a horizontal plane above the spider wheel, a pawl depending from the lever in position to engage a spider arm and part-circle turn the spider wheel upon predetermined arcuate motion of said lever; and said means including a swing arm fixed in connection with and projecting laterally outwardly from the lever for engagement with, and swinging by, the trunk or supporting stake of each grapevine upon advance of the apparatus, said arm, when so swung, effecting such predetermined arcuate motion of the lever, and means to return the swing arm to its initial position upon such arm escaping the vine trunk or stake.

5. An agricultural apparatus operative, upon advance along a vineyard row, to ground-deposit a quantity of dry, free-flowing soil conditioner adjacent each grapevine in the row, and to then discontinue such depositing until the next grapevine is reached; the apparatus comprising a bin for the soil conditioner, a rotary feeder mounted in connection with the bin and including a vertical cylindrical casing having a bottom plate, and a pocketed rotor journaled in the casing; the casing having a filling opening in communication with the bin, the bottom plate having an outlet opening therein circumferentially spaced from said filling opening, and the pockets in the rotor being formed and disposed so that when the rotor is in a position with one pocket registering with the filling opening to receive soil conditioner from the bin, another pocket registers with the outlet opening to deliver soil conditioner therethrough, a soil conditioner discharge tube leading from the outlet opening, a normally inactive mechanism associated with the rotary feeder and operative, when actuated, to turn the rotor to successive ones of said positions, and means to actuate said mechanism upon the apparatus passing each grapevine; there being a gate mounted in the bin in position to control the passage of soil conditioner through said filling opening, the gate being vertically adjustably guided in the bin, means to positionally adjust the gate from exeriorly of the bin, and means associated with said gate-adjusting means providing a visual indicator, exteriorly of the bin, of the position of the gate relative to said filling opening.

* * * * *